Patented Feb. 17, 1925.

1,526,942

UNITED STATES PATENT OFFICE.

GODFREY STEERUP, OF CHICAGO, ILLINOIS.

STORAGE-BATTERY SEPARATOR AND METHOD OF PRODUCING SAME.

No Drawing.   Application filed March 27, 1922. Serial No. 547,206.

*To all whom it may concern:*

Be it known that I, GODFREY STEERUP, a citizen of the United States, residing at Chicago, in the county of Cook and State of Illinois, have invented certain new and useful Improvements in Storage-Battery Separators and Methods of Producing Same, of which the following is a specification.

The material now most commonly used for storage battery separators is wood, including bass, poplar and the woods belonging to the sequoia family. When the wood is in good condition and free from such physical defects as knots and pin holes, and when properly treated chemically to remove constituents injurious to the battery, it will give fair service for a limited time provided the battery is not over-charged, but high concentration of the battery acid and high temperatures are ruinous to wood separators. Each of these conditions is often met with in the lead battery used for starting and ignition and consequently wood separators used in such batteries gradually disintegrate and become useless for the intended purpose. The inefficiency of wood as a battery separator will be indicated by the changes apparent if a wood separator is subjected to a few cycles of charge and discharge in sulphuric acid of specific gravity 1.285 to 1.300. Other materials, such as glass, clays, vulcanized rubber and fabrics in a variety of forms and shapes have been used but without satisfactory results.

The most important causes of failure of the separators which have been used are (1) the chemical nature of the material is not such as to resist the combined action of temperature and acid; and (2) the physical structure of the separator is not of proper porosity and structural flexibility to permit the diffusion and the circulation of the ions without a physico-chemical disintegration.

The object of my invention is to provide a storage battery separator which will stand up in battery acid at any temperature which might reasonably be expected in a battery, which can be easily shipped, and which will not be affected by climatic conditions.

A further object of the invention is to provide a separator having a substantial degree of elasticity, which can be produced at comparatively low cost by molding, pressing, rolling or otherwise and in any shape, size or form, which is comparatively soft and pliable and which will give greater service than any other separators known to me.

The invention further consists in the method of producing my improved separator.

For my separator I use unvulcanized rubber and a porous silicious material and I have found the following to be a satisfactory method of producing the separator:

250 grams of a good grade of rubber gum, such as Pará gum, or its equivalent suitable for the purpose, is partially dissolved or jellified cold with 7000 c. c. of carbon tetrachloride. To 3000 c. c. of this jelly is added 600 grams of diatomaceous earth, such as kieselguhr, or its equivalent suitable for the purpose, and which has absorbed 2000 c. c. of water. I prefer that the silicious material shall have been suitably purified as by floating it with water and separating it and removing the heavier particles. The mixture of jellified gum and silicious material is kneaded thoroughly while 300 grams of dried silicious material is being added, the whole forming a dough-like and homogeneous mass. This mass may be molded or pressed in separator molds or it may be rolled or otherwise formed into sheets from which the separators can be cut or stamped, or it may be formed into separators of any size, shape and form in any other suitable manner and with any suitable means. The separators can be made immediately after the dough is produced or the dough may be rolled into sheets and shipped in this form so that the separators can be cut, stamped or otherwise produced from the sheets for the manufacture or for the repair of batteries as and wherever desired. I contemplate producing these sheets of any desired thickness and I believe that from $\frac{1}{32}$ inch to $\frac{1}{16}$ inch will be satisfactory for this purpose. The finished separators or the sheets may be dried by optional methods and the evaporated tetrachloride saved as, for example, by drying in the atmosphere at a temperature at or below 100° C.; or by driving off the tetrachloride by steam, followed by air drying; or by driving off the carbon tetrachloride by immersion in hot water followed by air drying.

My improved separator has certain characteristics which distinguish it from other separators; it is soft to the touch, suggestive of chamois skin; it is pliable and elastic; it is of very high liquid absorbing quality; it does not disintegrate in hot battery acid; and it is not affected by climatic conditions. It has a substantial degree of elasticity which is advantageous in producing the separators and in the handling and use thereof, and it also enables the separator to better stand the action of the hot battery acid.

I have found in practice that Pará gum and a diatomaceous earth, such as kieselguhr, in or about the proportions mentioned, produce very satisfactory results but I do not limit myself to these particular materials but reserve the right to use any equivalent therefor which will produce the same or substantially the same results; and I also reserve the right to change the proportions of the ingredients as may be desired to suit conditions as they arise in the trade.

I claim:

1. A separator for storage batteries comprising a homogeneous mixture having a substantial proportion of unvulcanized rubber in its composition.

2. A separator for storage batteries comprising a homogeneous mixture having substantial proportions of silicious material and unvulcanized rubber in its composition.

3. A separator for storage batteries characterized by a high liquid absorbing quality and comprising a homogeneous mixture of a silicious material and unvulcanized rubber.

4. The herein described method of producing a material for storage battery separators which consists in mixing unvulcanized rubber gum partially dissolved or jellified with a silicious material saturated with water and working the mixture into a homogeneous mass and then reducing the mass to a form from which separators may be produced by molding, pressing, stamping or otherwise in desired shapes.

5. The herein described method of producing a material for storage battery separators which consists in partially dissolving or jellifying unvulcanized rubber gum cold with carbon tetrachloride and then mixing the same with a silicious material saturated with water, and then working the mixture into a homogenous mass and reducing the mass to a form from which separators may be cut or otherwise produced.

6. The herein described method of producing a material for storage battery separators which consists in partially dissolving or jellifying unvulcanized rubber gum and mixing the same with a silicious material saturated with water; kneading the mixture and adding dry silicious material to form a dough-like homogeneous mass; and then reducing the mass to a form from which separators may be cut or otherwise produced.

7. The herein described method of producing a material for storage battery separators which consists in partially dissolving or jellifying unvulcanized rubber gum cold with carbon tetrachloride and mixing the same with a silicious material saturated with water; then working the mixture and adding dry silicious material to form a dough-like homogeneous mass and then reducing the mass to a form from which separators may be cut or otherwise produced.

8. The herein described method of producing a material for storage battery separators which consists in partially dissolving or jellifying unvulcanized rubber gum cold with carbon tetrachloride in or about the proportions of 250 grams of gum and 7000 c. c. of carbon tetrachloride; mixing the partially dissolved or jellified gum with diatomaceous earth in or about the proportions of 3000 c. c. of gum to 600 grams of earth containing 2000 c. c. of water; working the mixture and adding approximately 300 grams of dry diatomaceous earth to form a dough-like homogeneous mass and then reducing the mass to a form from which separators may be cut or otherwise produced.

GODFREY STEERUP.